No. 726,536.
PATENTED APR. 28, 1903.
O. HOLZ.
MECHANISM FOR DRIVING SHAFTS AT VARIABLE SPEED BY MEANS OF ALTERNATING CURRENT MOTORS.
APPLICATION FILED AUG. 15, 1902.
NO MODEL.
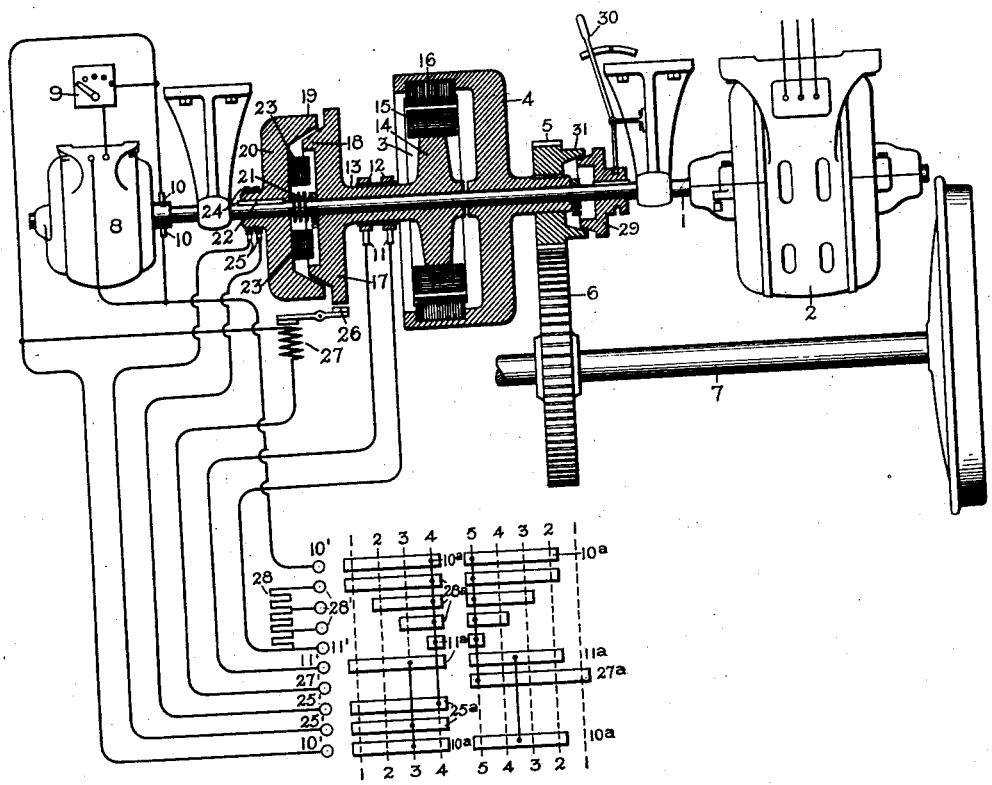
Witnesses.
George H. Tilden
Benjamin B. Hull.
Inventor.
Otto Holz.
by Albert G. Davis
Att'y.

United States Patent Office.

OTTO HOLZ, OF SCHENECTADY, NEW YORK, ASSIGNOR TO GENERAL ELECTRIC COMPANY, A CORPORATION OF NEW YORK.

MECHANISM FOR DRIVING SHAFTS AT VARIABLE SPEED BY MEANS OF ALTERNATING-CURRENT MOTORS.

SPECIFICATION forming part of Letters Patent No. 726,536, dated April 28, 1903.

Application filed August 15, 1902. Serial No. 119,695. (No model.)

*To all whom it may concern:*

Be it known that I, OTTO HOLZ, a citizen of the United States, residing at Schenectady, county of Schenectady, State of New York, have invented certain new and useful Improvements in Mechanism for Driving Shafts at Variable Speed by Means of Alternating-Current Motors, of which the following is a specification.

This invention relates to mechanism for transmitting power from a motor to a driven shaft, and especially where the motor runs at a constant speed, while the speed of the shaft must vary from full speed to zero. Such a device is of special value when the motor is an alternating-current electric motor which runs at a nearly-constant speed under a varying load. In many cases, such as that of an electric car, it is necessary to stop and start frequently, with a demand for large starting torque in order to accelerate speed rapidly.

My invention consists in the combination, with a main alternating-current motor and a shaft to be driven thereby, of intermediate mechanism comprising an auxiliary induction-motor, one of whose elements is driven by the main motor, while the other element is connected with the shaft to be driven. The primary winding of the auxiliary motor is excited from a source of direct current, and by varying this exciting-current the slip of the auxiliary motor is varied and with it the speed of the driven shaft. In order to stop the driven shaft, I arrange to cut off the exciting-current, check the rotation of the driving member of the auxiliary motor, and then turn on the current again, thereby causing it to exert a retarding drag on the still-rotating driven member.

The several elements of my mechanism may be variously arranged to produce the desired result, and while I have shown only one specific arrangement yet I do not wish to be understood as thereby limiting my invention to that particular construction.

The accompanying drawing is a sectional elevation of mechanism embodying my invention.

The power-shaft 1 is driven at a constant speed by the main motor 2, which is preferably an alternating-current induction-motor of the three-phase type. Sleeved loosely on the shaft are the two elements of an auxiliary induction-motor, the primary 3 being independent of the secondary 4. One of these elements can be clutched to the power-shaft, while the other (in the drawing the secondary) is geared by a pinion 5 and spur-gear 6 to the driven shaft 7, which may be a car-axle, as shown. Driven by the shaft 1 in any suitable manner is the armature of a direct-current generator 8, whose shunt field-coils have a rheostat 9 in series with them to enable the output of the generator to be varied at will. The current from this generator is led from the brushes 10 to the primary 3 of the auxiliary induction-motor by means of brushes 11 and collector-rings 12 on the sleeve 13, carrying said primary.

The auxiliary induction-motor is preferably constructed as follows: The sleeve 13 carries a member 14, having a number of polar extensions, on each of which is mounted a coil 15, the several coils being all connected in series and the winding reversed in alternate coils to produce alternate polarities in the extensions. The secondary 4 carries a closed-circuit winding 16, which may be of the well-known squirrel-cage type. As the primary winding is energized by a continuous current from the exciter it produces a constant multipolar field, and when this is revolved in proximity to the secondary currents are induced in the winding 16, as in the rotor of an ordinary polyphase induction-motor. The secondary 4 is therefore caused to rotate with the rotating primary 3 when the latter is coupled to the power-shaft.

Means are provided for clutching the driving member of the auxiliary motor to the power-shaft at will. In the drawing the primary 3 is the driving member, and the clutch is a friction-clutch operated electromagnetically, though any suitable form of clutch may be used. As shown, the sleeve 13 carries a disk 17, having a beveled flange 18 to engage with a beveled flange 19 on a disk 20, splined on the power-shaft and normally held out of engagement with the disk 17 by an interposed helical spring 21 or otherwise, as may be desired. The spline 22 permits the disk 20 to have a longitudinal movement on the shaft 1, but compels it to rotate therewith.
On one of the disks, preferably the disk 20, are one or more magnet-coils 23, connected in series and with two insulated slip-rings 24 on the hub of the disk. Brushes 25 bear against said rings and convey current to the magnets. When energized, they attract the disk 17 and cause an engagement of the beveled surface, so that the disk 17, hub 13, and primary 3 are compelled to rotate with the disk 20 and power-shaft 1.
The primary 3 is provided with a brake (indicated as a shoe 26) engaging with the edge of the disk 17. It may be operated in any suitable manner, preferably by an electromagnet 27, adapted to be put in circuit with a source of electric current.

The various circuit connections for starting and stopping the driven shaft are effected by suitable switches. I prefer to group them all in one structure, so that the several circuit changes may be made in succession by the movement of a single handle. Such a controller is shown in the drawing, where the leads from the exciter-brushes 10 are brought to fingers 10', the leads from the primary winding to fingers 11', the leads from the clutch-magnets to fingers 25', and one lead from the brake-magnet to finger 27', the other terminal of said magnet being permanently in circuit with the negative brush of the exciter. On a suitable controller-cylinder (shown developed in the drawing) are segments 10$^a$ coacting with the fingers 10', segments 11$^a$ coacting with the fingers 11', segments 25$^a$ coacting with the fingers 25', and a segment 27$^a$ coacting with the finger 27'. There are also stepped segments 28$^a$ coacting with fingers 28', which are connected with the sections of a resistance 28. The controller is arranged to move either way from a central "off" position.

The operation of the device is as follows: Suppose the main motor, the power-shaft, and the disk 20 to be rotating at full speed, the other parts being at rest, and it is desired to start the load. The left-hand set of segments is brought into contact with the fingers, sending current simultaneously through the primary winding and the clutch-magnets. The primary 3 is therefore caused to rotate with the power-shaft, while the magnetic flux generated by the primary winding induces current in the secondary winding and sets up a drag thereon, so that the secondary begins to rotate. Its motion is communicated to the shaft 7 through the gears 5 6. The exciting-current is at first rather weak, owing to the resistance 28; but as this is cut out by a further movement of the controller the current becomes stronger, until in the fourth position of the controller all the resistance is cut out and the primary winding generates its full field strength. As the slip between the primary and secondary is very great at startin the current generated in the secondary very large, and thus I obtain good starti torque. The slip quickly lessens as the spe of the driven shaft increases until at runni speed the slip is only sufficient to cause t generation of the proper magnetizing-curre in the secondary. The running speed can t varied at will by shifting the rheostat 9 c cutting in or out the resistance 28, so as t supply more or less current to the primar winding, and thus vary the strength of th field, and consequently the relative speed c the primary and secondary necessary to gen erate enough current in the secondary t carry the load. When it is desired to sto the driven shaft, the controller is turne backward, gradually cutting off current from the primary winding and finally from th clutch-magnets. This leaves the deëner gized primary revolving by its own momen tum. A continued backward movement of the controller brings the right-hand set of seg ments into circuit. In the first position the magnet 27 is energized and applies the brake to the disk 17, which quickly stops the primary. The exciting-current is then turned on again by a further backward movement of the controller, energizing the primary more and more strongly until the reaction between the stationary primary and the still-revolving secondary exerts a powerful retarding effect on the latter, which is transmitted by the gears to the driven shaft and rapidly slows it down.

If desired, the apparatus between the main motor and the driven shaft may be used merely at starting, and when running at full speed the primary may be deënergized and stopped and the power-shaft connected directly to the driven shaft. This may be done in a variety of ways. For instance, there may be a clutch 29 splined on the power-shaft and movable by means of a lever 30 into engagement with a coöperating part 31 on the pinion 5.

Having thus described my invention, what I claim as new, and desire to secure by Letters Patent of the United States, is—

1. The combination with a power-shaft and a shaft to be driven, of intermediate connecting mechanism comprising two independently-rotatable members, a closed winding on one of said members, a primary winding on the other of said members, a direct-current exciter for said primary winding driven by the power-shaft, and means for connecting one member to said power-shaft and the other to the driven shaft.

2. The combination with a power-shaft and a shaft to be driven, of intermediate connecting mechanism comprising two independently-rotatable members, a closed winding on one of said members, a primary winding on the other member, a direct-current exciter for said primary winding driven by the power-shaft, means for varying the exciter-current, and means for coupling one of said members to the power-shaft and the other to the driven shaft.

3. The combination with a power-shaft and a shaft to be driven, of intermediate connecting mechanism comprising two independently-rotatable members, a closed winding on one of said members, a primary winding on the other member, a source of direct-current for energizing said primary winding, means for connecting one of said members with the power-shaft, a brake for checking the rotation of said member when disconnected from said shaft, and means for connecting the other member with the driven shaft.

4. The combination with a power-shaft, of a main alternating-current motor driving the same at a practically constant speed, a shaft to be driven at varying speeds, intermediate connecting mechanism comprising an auxiliary induction-motor having one element geared to the driven shaft and the other adapted to be connected with the power-shaft, a clutch for effecting said connection, a source of direct current for energizing the primary of said auxiliary motor, a brake for checking the rotation of the driving element of the auxiliary motor, and a device which successively deënergizes said element, unclutches it from the power-shaft, applies the brake, and again energizes said element.

5. The combination with a power-shaft, of an alternating-current motor driving the same at practically constant speed, a shaft to be driven at varying speeds, and intermediate connecting mechanism comprising an auxiliary induction-motor, means for connecting one element of said auxiliary motor with said power-shaft and the other element with the driven shaft, and means for varying the strength of the field of said auxiliary induction-motor.

6. The combination with a power-shaft, of a shaft to be driven thereby, intermediate connecting mechanism comprising an auxiliary induction-motor having one element geared to the shaft to be driven and the other adapted to be connected with the power-shaft, a clutch for effecting said connection, a source of current for energizing the primary member of said auxiliary motor, a brake for checking the rotation of the driving element of the auxiliary motor, and a switch having its contacts constructed and arranged to supply current to energize the clutch and the primary member of said auxiliary motor to operate the driven shaft and to energize the brake and the primary member of said auxiliary motor to check the rotation of the driven shaft.

In witness whereof I have hereunto set my hand this 12th day of August, 1902.

OTTO HOLZ.

Witnesses:
BENJAMIN B. HULL,
ALMA L. MENSCHKE.